United States Patent [19]

Kouno

[11] Patent Number: 4,466,307

[45] Date of Patent: Aug. 21, 1984

[54] INDUSTRIAL ROBOT

[75] Inventor: Toshio Kouno, Tokyo, Japan

[73] Assignee: Dainichi Kiko Kabushiki Kaisha, Tokyo, Japan

[21] Appl. No.: 299,532

[22] Filed: Sep. 4, 1981

[30] Foreign Application Priority Data

Sep. 14, 1980 [JP] Japan .............................. 55-127644

[51] Int. Cl.³ .......................... B25J 3/02; G05G 1/04
[52] U.S. Cl. ...................................... 74/479; 74/469; 74/103; 248/280.1; 414/1; 414/4; 414/917
[58] Field of Search ................... 74/469, 479, 103; 414/1, 4, 917; 248/280.1, 281.1

[56] References Cited

U.S. PATENT DOCUMENTS

| 3,800,667 | 4/1974 | Ponter | 91/380 |
| 3,883,105 | 5/1975 | Matsumoto | 414/917 X |
| 3,995,756 | 12/1976 | Hjelm | 414/917 X |
| 4,215,972 | 8/1980 | Yamasaki et al. | 414/917 X |
| 4,367,998 | 1/1983 | Causer | 414/4 |

FOREIGN PATENT DOCUMENTS

| 2820848 | 11/1978 | Fed. Rep. of Germany | 414/917 |
| 1209308 | 10/1970 | United Kingdom | 414/917 |

Primary Examiner—Allan D. Herrmann
Attorney, Agent, or Firm—Murray Schaffer

[57] ABSTRACT

A robot having an arm and an adapted actuating mechanism of a parallelogram construction, formed of vertical arms having the forward and rearward movement regulated within a fixed range, parallel rods having the up and down movement regulated within a fixed range, upper links and a forward horizontally extending horizontal arm is supported by side plates. At least the above mentioned vertical arms are provided with an X-axis driving device and the parallel rods are provided with a Z-axis driving device and means to balance the load of the work and arm mechanism.

7 Claims, 14 Drawing Figures

INDUSTRIAL ROBOT

BACKGROUND OF THE INVENTION

This invention relates to a small industrial robot most adapted to handle comparatively light work.

Various industrial robots have already been created. However, each has various problems in their stability and reliability during operation. For example, even if the work to be handled is light, when the arm weight is added to it, the load will be so considerable that a large driving force will be required to control the positioning of the load. However, if a large driving force is used, it will be so difficult to control the positioning that no accurate stopping or precision in positioning will be obtained.

SUMMARY OF THE INVENTION

In order to solve this problem the present invention balances the arm mechanism in advance with a driving force matching the load of the work weight and arm weight and the positioning is made by a driving source separate from this driving force. The arm mechanism will then be able to be operated with an operating force so small that an easy and accurate positioning will be possible and further its stopping precision will be able to be elevated more positively.

The present invention provides a small industrial robot wherein, the balance with the load is kept by an air pressure cylinder, so that the teaching operation can be made very easily and accurately with a small operating force. A higher degree of stopping precision can be obtained in the positioning control and the hand part can always be kept horizontal. Various setting methods are possible and the stability and reliability are high.

DESCRIPTION OF THE INVENTION

Figure 1:
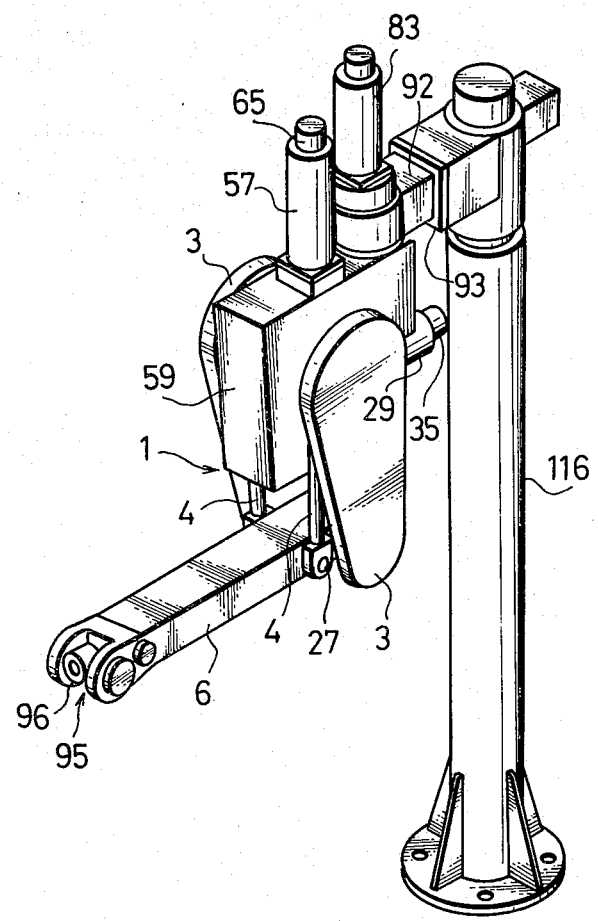
FIG. 1 is a perspective view of an industrial robot according to the present invention.
Figure 2:
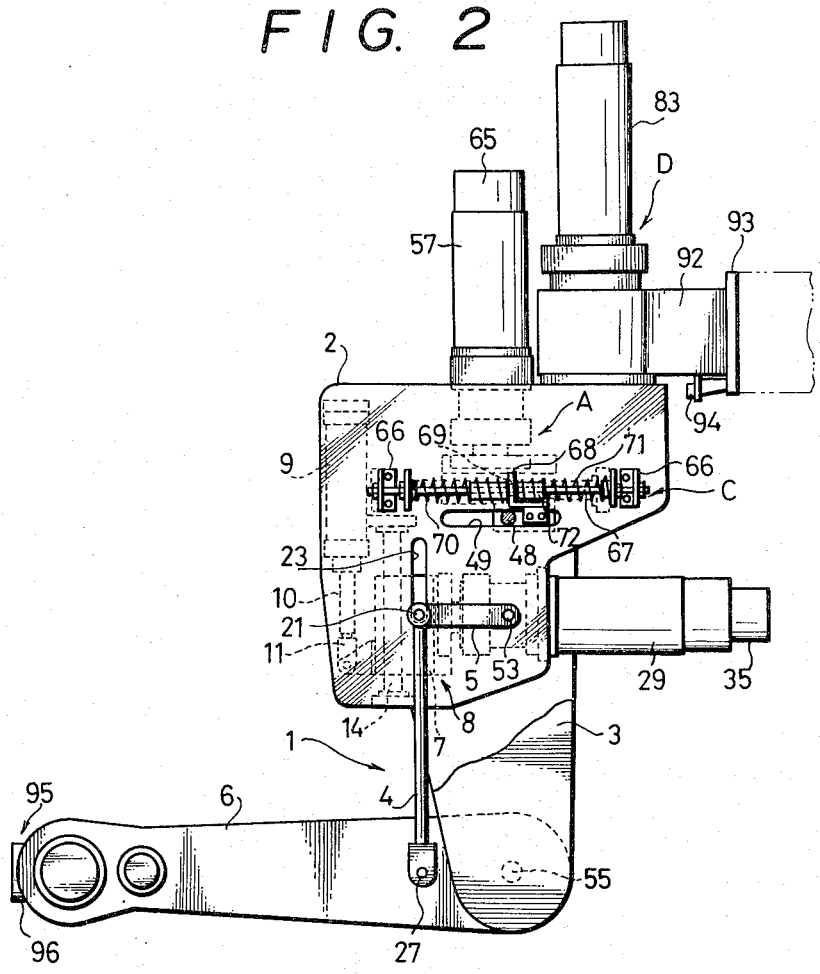
FIG. 2 is a partly sectioned side view of the robot shown in FIG. 1.

In FIGS. 1 and 2, the reference numeral 1 denotes generally an actuating mechanism for an arm 6. The mechanism is of a parallelogram formation arranged and supported within a body comprising a pair of parallel side plates 2 provided with a cover 59. The arm mechanism can be operated forward and rearward (movement in the X-axis) and up and down (movement in the Z-axis) and rotated (movement of the θ-axis). During operation, this arm mechanism 1 will be balanced with the load on the arm 6 and the arm weight itself so as to be positionable with a very small operating force and at a high stopping precision.

The formation of the arm actuating mechanism 1 shall be explained in the following. As shown in FIG. 2, this mechanism 1 is formed to be of a parallelogram comprising a pair of vertical arms 3 providing the movement in the X-axis, that is, the forward and rearward movement regulated within a fixed range; vertical parallel rods 4 providing the movement in the Z-axis, that is, the up and down movement regulated within a fixed range and positioned on the exterior of the side plates 2; and, horizontal upper links 5 and the arm 6 which extends forward horizontally below the side plates 2.

Figure 3:
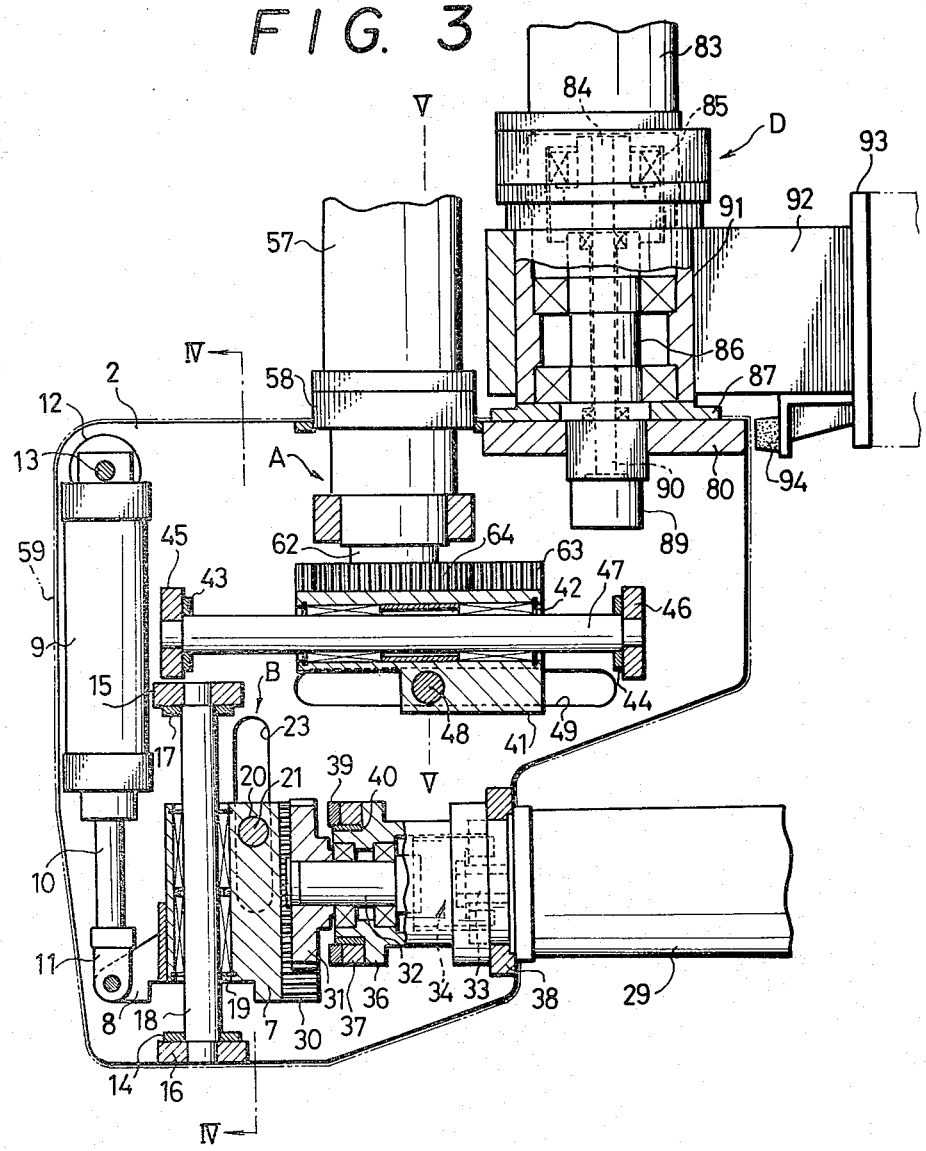
FIG. 3 is an enlarged view of FIG. 2.
Figure 4:
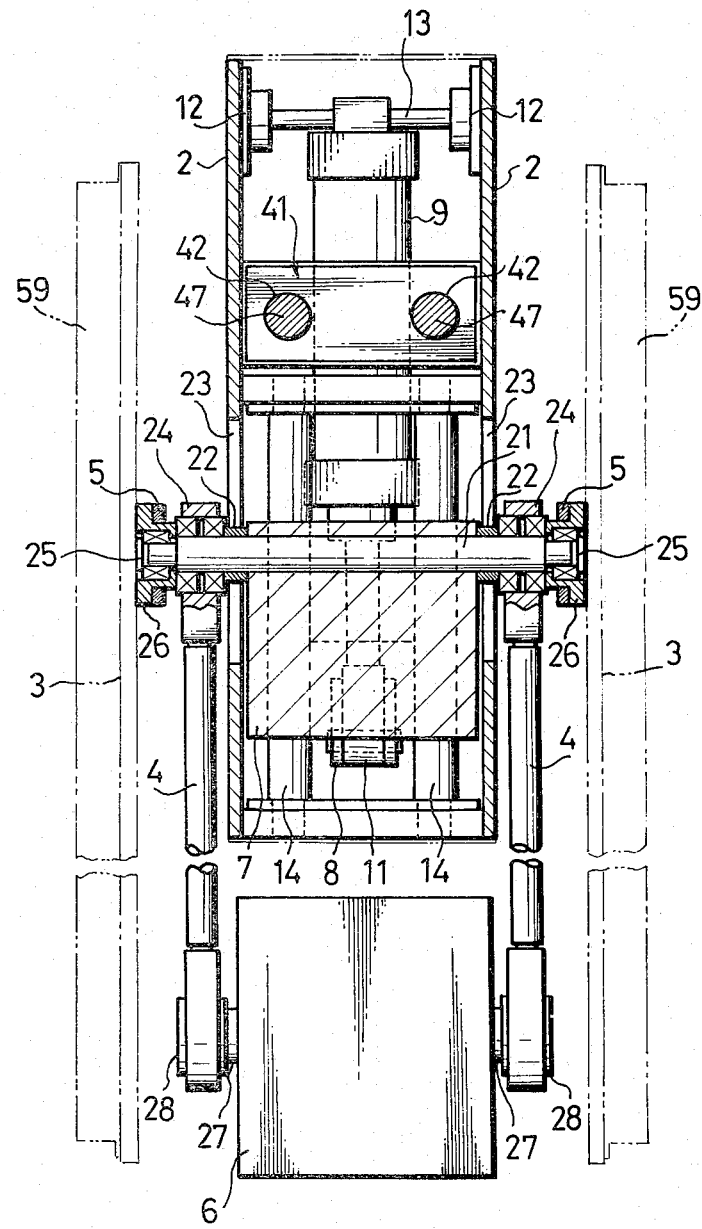
FIG. 4 is a sectional view taken on line IV—IV of FIG. 3.

A Z-axis driving device generally referred to by the letter B is shown in FIGS. 3 and 4. A slider 7 is arranged substantially in the middle between the side plates 2 and is joined at one end by a fitting 8 to the knuckle joint 11 of the piston rod 10 of an air pressure cylinder 9. This air pressure cylinder 9 is arranged vertically between the side plates by attaching its base end to a transverse rod 13 journalled in fittings 12 provided in the upper part of the side plates 2. A pair of guide shafts 14 are secured at their upper and lower ends respectively through metal pieces 17 and 18 to brackets 15 and 16 which are fixed substantially in the middle and at the lower sections of side plates 2. These guide shafts 14 slide respectively in vertical guide holes 19 provided in the slider 7. A horizontal guide hole 20 is formed in the slider 7 through which a supporting shaft 21 is slidably inserted. As seen in FIG. 4, rollers 22 are provided respectively adjacent the ends of the supporting shaft 21 in alignment with the side plates 2. The rollers 22 are slidably fitted respectively in vertical guide slots 23 formed in the side plates 2. Further, the parallel vertical rods 4 are rotatably journal on the shaft 21 just to the exterior of the rollers 22, by bearings 24 and the upper links 5 are similarly pivotally journalled at the extreme tips respectively of the shaft 21 by bearings 25 and 26. The parallel vertical rods 4 are pivotally journalled at their lower ends to an axle 27 by bearings 28, which axle 27 extends through the forwardly extending horizontal lower arm 6. The parallel rods 4 are always balanced with the load formed by both the work weight and arm weight by the vertical thrust of the air pressure cylinder 9 acting on the slider 7.

Movement in the Z-axis is obtained by vertically driving the parallel rods 4 with a small operating force by the torque of a reversible motor 29 so as to raise or lower the slider 7 with high stopping precision. To effect this movement, a rack 30 is formed on the rear end of the slider 7; and a rotary shaft 32 having a pinion 31, which meshes with the rack 30, is connected to a speed reduction device 34 provided on the output shaft 33 of the motor 29. The speed reduction device is arranged so that the number of rotations of the motor 29 indicated and controlled by a pulse encoder 35 (FIG. 1) is reduced at a predetermined ratio and transmitted to the rack 30. Therefore, the slider 7 will move up and down along the guide shafts 14, causing the supporting shaft 21 to also move up and down and the rollers 22 slide up and down within the guide slots 23. As a result the horizontal arm 6 is caused to move in the Z-axis up and down in the vertical direction. A bearing case 36 is fixed at both ends to the side plates 2 by plate members 37 and 38 supports the rotary shaft 32. The backlash of the meshing of the pinion 31 and rack 30 with each other is eliminated by a clamp 39 and brush 40.

By forming parallel rods 4 in the Z-axis mode, the load created by the work weight and arm mechanism 1 can always be balanced with the thrust of the air pressure cylinder 9. Therefore, the movement of the parallel rods 4 can be operated independently of this load, with a predetermined torque of the motor 29 controlled and reduced by the indication and control of the pulse encoder 35. Therefore the computer side can be controlled with a very small driving force. The motor 29 may be any driving motor such as a direct current servo-motor, alternating current induction motor and pulse motor provided with a brake.

Figure 5:
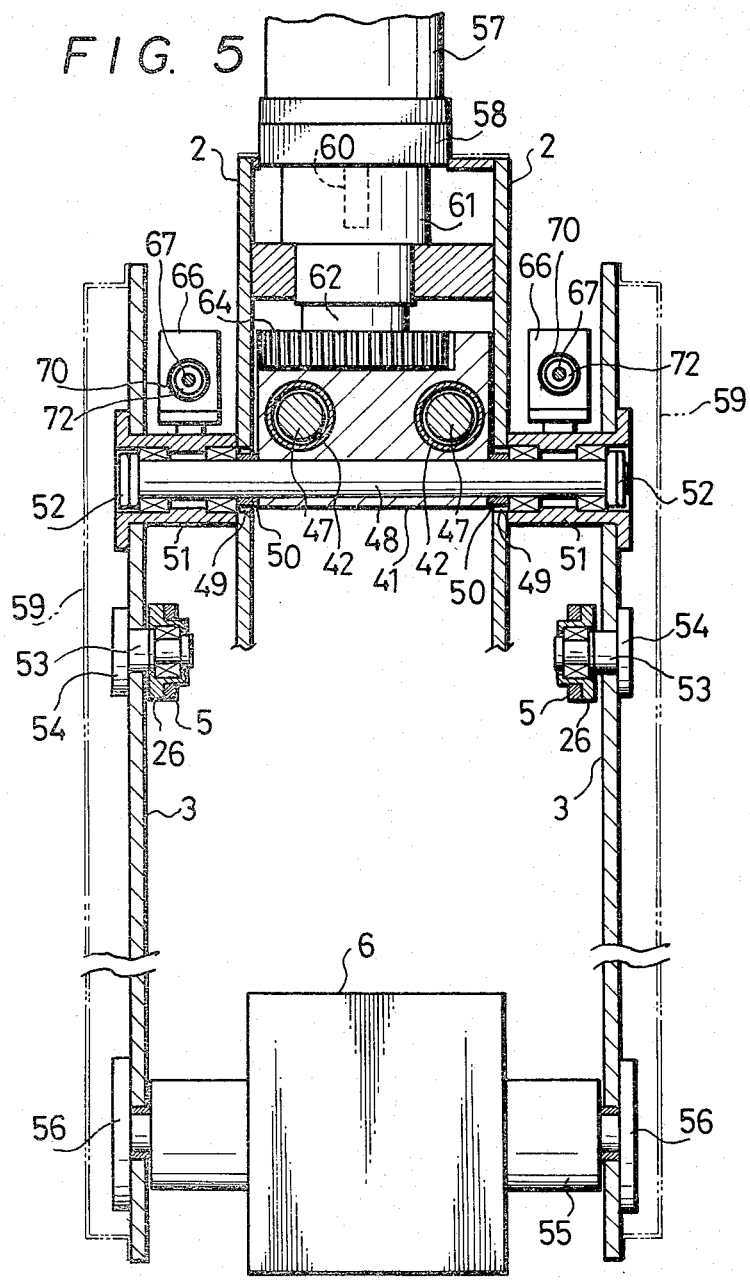
FIG. 5 is a sectional view taken on line V—V of FIG. 3.

The X-axis driving device A for the vertical arms 3 is denoted by the letter A and is explained in detail with reference to FIGS. 3 and 5. A second slider 41 is arranged in the upper part of the side plates 2 to move horizontally. A pair of guide holes 42 are formed in the slider 41 parallel with the side plates 2, and a guide shaft is placed through each hole. The guide shafts 47 are supported at their respective ends on plates 43 and 44 and brackets 45 and 46 fixed to the side plates. A supporting shaft 48 is inserted transversely at right angles with and below the guide holes 42 of the slider 41. As shown in FIG. 5, this supporting shaft 48 is slidably inserted at both ends through rings 50 and guide slots 49 made in the horizontal direction in the side plates 2. The vertically suspended arms 3 are pivotally journalled at their upper ends with bearing supporters 51 and metal retainers 52 to the ends of the supporting shafts 48. Further, these vertical arms 3 are pivotally connected substantially at their middle with the forward end of the horizontal links 5 by metal retainers 54 and a supporting axle 53. The arms 3 are similarly pivoted at their lower ends to the forwardly extending horizontal arm 6 with metal retaining pieces 56 and a supporting axle 55.

As in the system for movement in the Z-axis, a reversible motor 57 is the driving source for the slider 41. The motor 57 projects above the side plates 2 through a supporting fitting 58. A predetermined torque is produced by a similar formation of a speed reduction device 61 connected to the output shaft 60 of the motor 57, the number of rotations of the output shaft 62 being transmitted to a pinion 64 meshing with a rack 63 formed on the upper edge of the slider 41. (Though the details are not illustrated, the concrete formation is the same as of the above mentioned Z-axis driving device B.) The rotation of the motor 57 is indicated and controlled by a pulse encoder 65, the number of rotations being reduced on the computer side by the pulse encoder 65 and transmitted to the rotary shaft 62, pinion 64 and rack 63 causing the slider 41 to reciprocably move in the forward and rearward direction along the guide shaft 47. Therefore, the arm mechanism 1 will be able to be moved forward and rearward in the X-axis.

Further, in order to balance this X-axis, that is, to balance the arms 3, a balancing device C as illustrated in FIG. 2 is fitted on the exterior of each of the side plates 2. Each of the balancing devices C, comprise a rod 67 arranged between a pair of support brackets 66 secured to the side plates 2. A partition 68 secured at its base to the slider 41 has a hole 69 through which the rod 67 is slidably fitted. The partition is located substantially in the middle of the rod 67. Adjustable compression springs 71 and 70, wound by stoppers 72, are located to right and left of the partition 68 on the rod 67. The spring 70 and 71 bias the partition 68 in its movement along the rod 67 in response to the forward and rearward movement of the slider 41 so that as the partition 68 moves it will move against the spring 70 or 71. A quick movement will be prevented and the arms 3 of the X-axis will be balanced.

Figure 8:
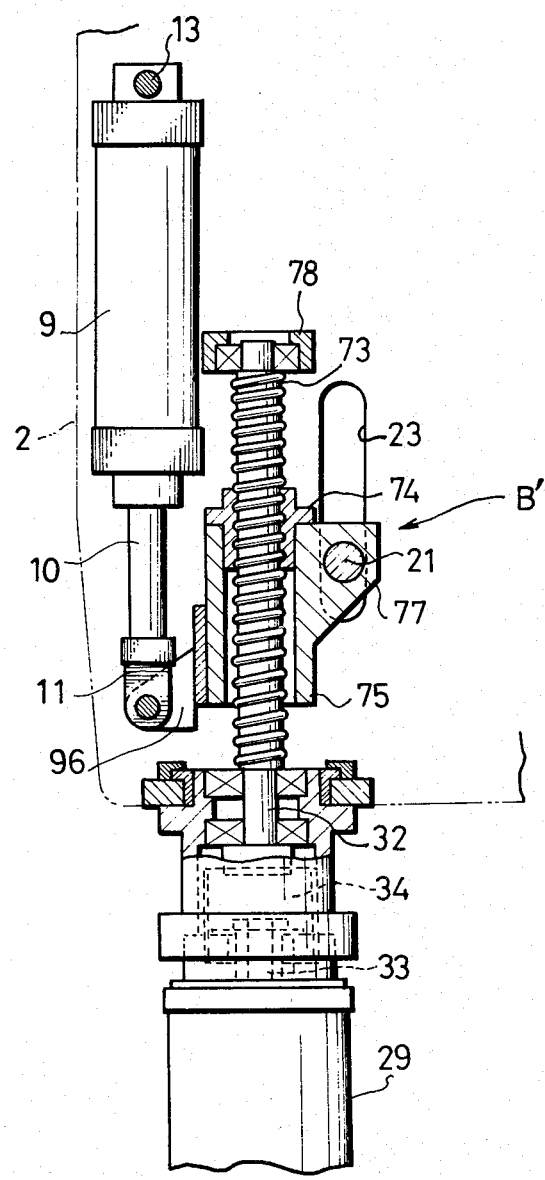
FIG. 8 is a partly sectioned side view of another embodiment of a Z-axis driving device employed in the present invention.
Figure 9:
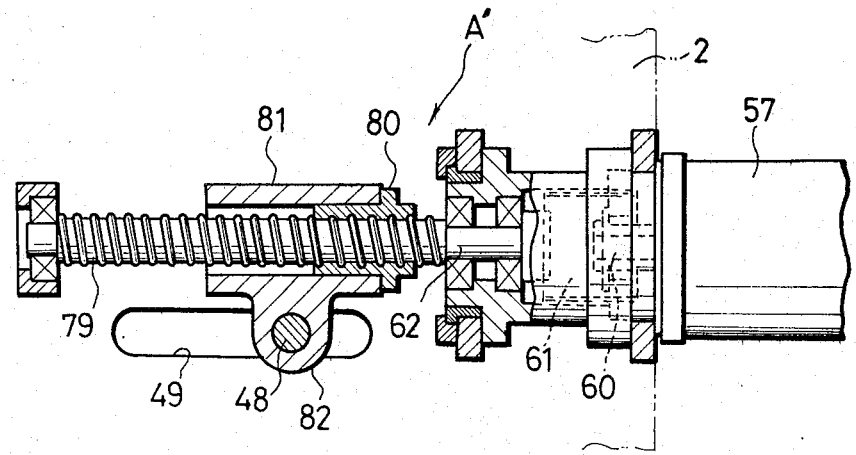
FIG. 9 is a partly sectioned side view of another embodiment of an X-axis driving device employed in the present invention.

The driving device illustrated in FIGS. 8 and 9 may be used in place of either of the above mentioned X-axis driving devices A and Z-axis driving device B. In any event, in both embodiments, the number of rotations of the driving motors 29 and 57 may be reduced at a predetermined ratio through the speed reduction device and the reduced rotations may be made the driving forces of the arms 3 of the X-axis or parallel rods 4 of the Z-axis. The embodiment illustrated in FIG. 8 is of a Z-axis driving device B wherein the piston rod 10 of the air pressure cylinder 9 has the knuckle joint 11 fitted to a slider 75. An internally threaded nut 74 is secured in a hole extending through the slider 75 and a threaded rod 74 is in screw engagement with the nut. The rod 74 is secured at one end to the output shaft 32 of the speed reduction device 34 and at its other end is rotably journalled in a bracket 78 fixedly held between the two side plates 2. The shaft 21 supporting both the slider 75 and the rods 4 is fixed to a wing like bracket 77 of the slider and is slidably inserted through the guide slot 23. In the driving device B' of such formation, the rotation of the driving motor 29, provided with a brake and set at one end of the screw rod 73 will, be reduced by the speed reduction device 34 and, when the screw rod 73 connected to the rotary shaft 32 rotates, the supporting shaft 21 will move vertically through the guide slots 23 in response to the screw advance or retreat of the slider 75 integral with the nut 74. Therefore, the Z-axis will be able to be vertically moved at a high stopping precision.

FIG. 9 shows the other X-axis driving device A' wherein the reference numeral 79 denotes a threaded rod, which engages in a nut 80 integrally secured in a hole in the slider 81. The supporting shaft 48 is fixed to a bracket 82 on the slider 81 and is slidably inserted through the guide slot 49. The screw rod 79 is connected at one end to the driving motor 57, which is also provided with a brake, and is indicated and controlled by a pulse encoder so that the screw rod 79 connected to the rotary shaft 62 will rotate at reduced in the speed to a predetermined number of rotations by the speed reduction device 61. Therefore the slider 81 will advance and retreat with the screw, and the supporting shaft 48 will move through the guide slots 49 with this movement and the arms 3 of the X-axis will move forward and rearward at a high stopping precision.

Figure 10:
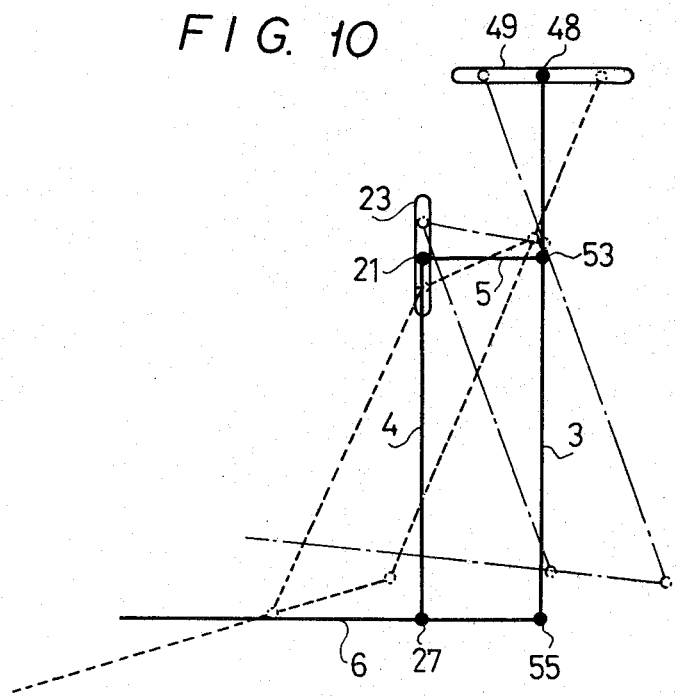
FIG. 10 is a line sketch explaining the operating of the robot of FIG. 1.

The movements of these X-axis and Z-axis shall now be explained. As shown in FIG. 10, the supporting shaft 48 will be a fulcrum in the movement of the X-axis, the supporting shaft 21 will be a fulcrum in the movement of the Z-axis and the arm mechanism 1 will always keep the parallelogram formation. Further the triangle connecting the supporting shafts 48 and 55 and the work fitting part of the arm 6 will be always similar to each other. Therefore, into whatever position the work fitting part may move, the thrust of the air pressure cylinder 9 balancing the arm mechanism 1 will always be kept constant and will not be out of balance.

The θ-axis driving device D for swinging the mechanism 1 during operation is explained with regard to FIG. 3. The driving device D, comprises a reversible motor 83 provided with a brake, which has an output shaft 84 connected to a speed reduction device 85 which itself has an output shaft 86 fitted at its other end to a plate bracket 87 to a retaining beam 88 secured to the top edges whereby rotation is transmitted to the body formed by the side plates 2. The output shaft 84 is also connected with a controlling rotary shaft 90 inserted through the driving output shaft 86 and is provided at its free end with a pulse encoder 89. A casing 91 and, a box 92 for such instruments as a memory device are mounted on the casing. The box 92 is mounted to the standard 116 (FIG. 1) by fitting 93. A resilient shock absorbing bumper 94 is located below the box 92.

In operating the θ-axis driving device D shown, the driving motor 83 rotates and the controlling rotary shaft 90 provided with the encoder 89 will be reduced in the speed to the predetermined number of rotations by the speed reduction device 85. Therefore the driving output shaft 86 will rotate also at a reduced speed, in the same manner, but the indication and control by the pulse encoder 89 will be transmitted directly to the driving motor 83. Consequently, even if the driving motor 83 stops, the backlash will be very small and the accurate positioning will be at a high stopping precision.

Figure 6:
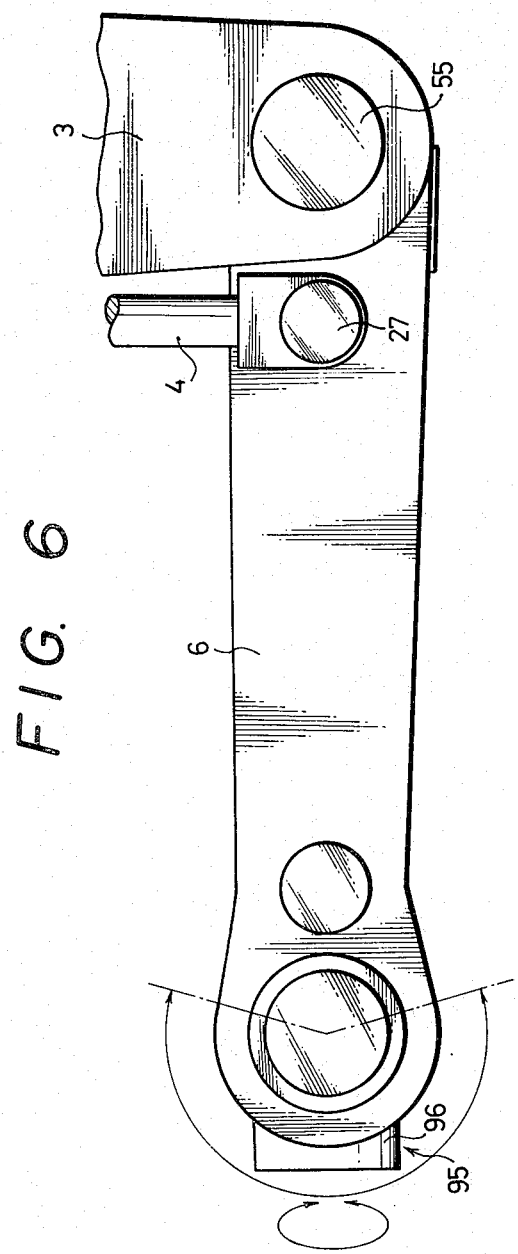
FIG. 6 is an enlarged view of the arm of the robot of FIG. 1.
Figure 7:
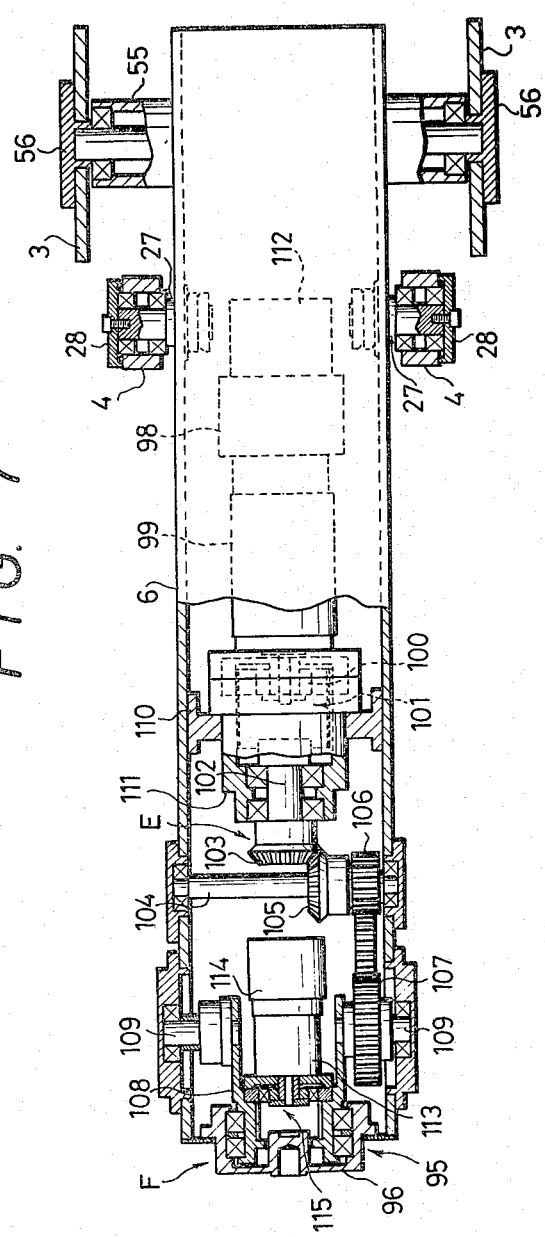
FIG. 7 is top plan view, partly sectioned of the arm of FIG. 6.

As seen in FIG. 1, the arm 6 is provided with a band 95 for holding a workpiece. The details of which are explained with reference to FIGS. 6 and 7. The hand 95, is swingable about a β-axis by a driving device E so as to effect a bending action and is rotatable about a γ-axis by a driving device F to make a rotating action. Further, the hand 95 is provided with a socket 96 so formed as to be able to be fitted with a predetermined holding mechanism. The β-axis driving device E comprises a driving motor 99, having a brake 98, is arranged substantially in the center of the arm 6. The output shaft 100 of the driving motor 99 is connected to a speed reduction device 101 which reduces the speed to a predetermined number of rotations. Backlash may be reduced and a high stopping precision may be obtained with an indication and control by a pulse encoder 112. The output shaft 102 of the speed reduction devices has at its forward end a bevel gear 103 which meshes with a bevel gear 105 provided on a rod 104 which is journalled in the side walls of the arm 6. A gear 106, provided on the shaft rod 104, meshes with a gear 107 which is fitted on a pin 109. The pin 109, together with a similar pin 109' (but without a gear) support a V-shaped bracket 108 on which the body for the hand 95. The inner end of pins 109 and 109' are fixed to the bracket 108 while the outer ends are journalled in the side walls of the arm 6. The holder 108 is provided at its forward tip with the socket 96 so that, with the rotation of the gear 107, the holder 108 will move in the vertical direction and the socket 96 will make a bending action with the axis of the rods 109 and 109' as a fulcrum.

The device F for making the hand 95 rotate about the γ-axis is provided within the bracket 108 and comprises a driving motor 113, also provided with a brake. The operation of the motor may be indicated and controlled by a pulse encoder 114. The number of rotations of the motor 113 may be reduced to a predetermined speed reduction ratio by the speed reduction device 115 the output shaft of which is directly connected to the socket 96. The socket 96 may be rotated and operated in this manner with reduced backlash and a high stopping precision.

Figure 11:
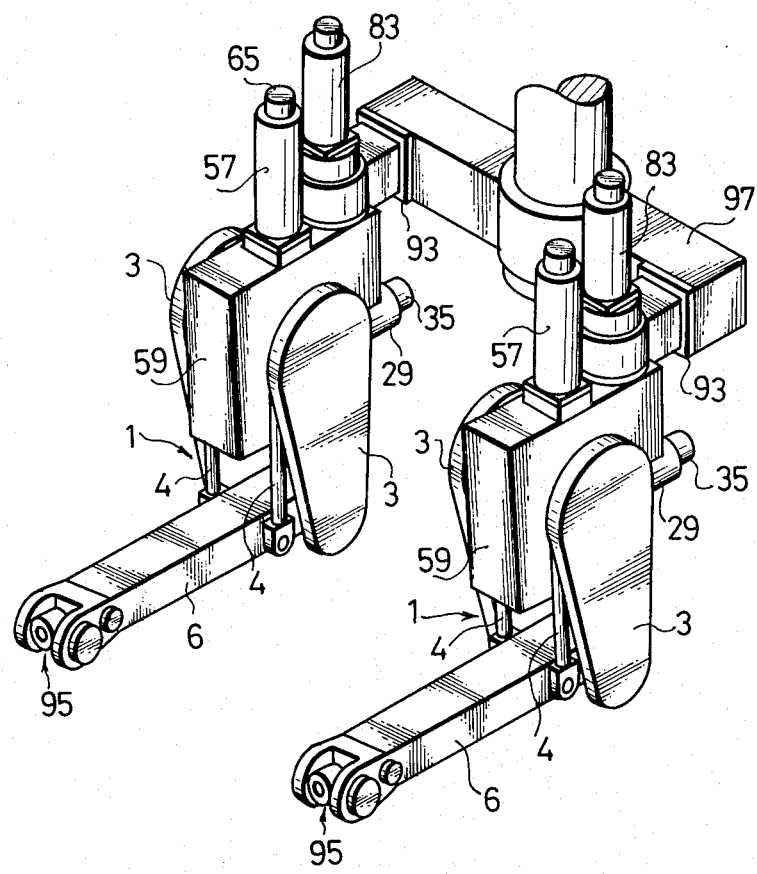
FIG. 11 is a perspective view of an embodiment in which a pair of robots of FIG. 1 are parallelly provided.

In the industrial robot of the above construction, while the load for the weight of the workpiece acting on the horizontal arm 6 and the load of the arm mechanism 1 itself is balanced by always making a balancing thrust with the air pressure cylinder 9 as mentioned above, the operation can be made with a small operating force at the time of the teaching mode or operation mode. The number of rotations of the driving motor can be reduced by a large speed reduction ratio by using the speed reduction device, and the indication and control by the pulse encoder can be directly regulated. Therefore the backlash can be reduced and the stopping precision can be kept higher during operation in any of the X-axis, Z-axis and θ-axis. The robot can be set not only on the ground with a supporting column 116 as shown in FIG. 1 through the fitter 93 but also directed upward or downward or in any other manner such as by being suspended from a ceiling. By parallelly arranging two or more robots on a common supporter 97 as shown in FIG. 11, there can be provided a most adaptable small industrial robot wherein the right and left robots can be simultaneously operated.

Figure 12:
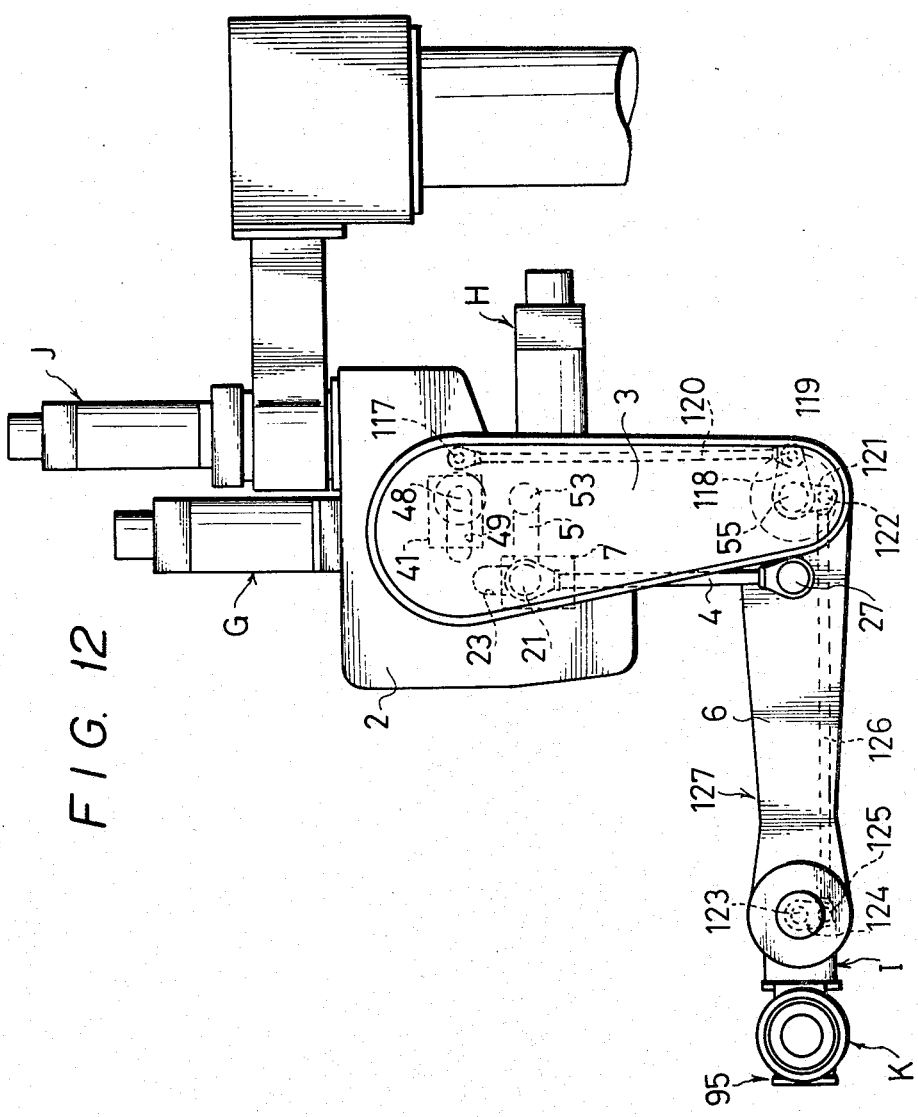
FIG. 12 is a partly sectioned side view of another embodiment of a robot according to the present invention.
Figure 13:
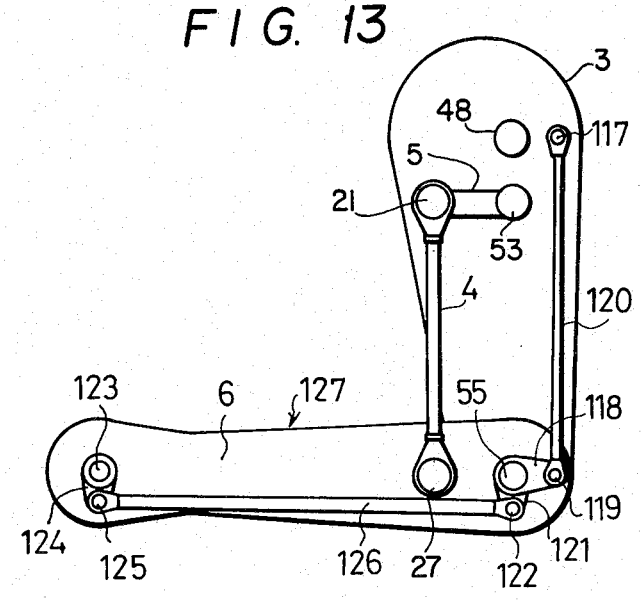
FIG. 13 is an enlarged view of the arm of the robot of FIG. 12.

There can be also provided an industrial robot of such construction as is shown in FIGS. 12 and 13. In these figures, first the formations of an X-axis driving device G and Z-axis driving device H shall be explained. The slider 41 forming the X-axis driving device G is provided with a supporting shaft 48 which has its ends project outward of the guide slots 49. A pivot pin 117 is located on a line with shaft 48 offset to the rear of the slot 49, to the side plates 2. The slider 7 forming the Z-axis driving device H is also provided with a supporting shaft 21 so as to project outward of the guide slots 23.

The vertical arms 3 are pivoted each at their upper ends to the above mentioned projecting supporting shaft 48 and are fitted at the lower ends with the horizontal arm 6 through the supporting axle 55. A link 118 fixed on the supporting pin 55 is provided with a pivot pin 119 extending into a position at a distance from the axis of the supporting pin 55 equal to the distance between the axis of the supporting shaft 48 and the axis of the supporting pivot pin 117. That is to say, the link 118 is fitted so that the straight line connecting the axis of the supporting shaft 48 and the axis of the supporting pin 117 and the straight line connecting the axis of the supporting axle 55 and the axis of the supporting shaft 119 may be parallel with each other. A vertical rod 120 is connected between the supporting pins 117 and 119. Therefore, the rectangle formed by connecting the respective axes of these supporting members 48, 117, 119 and 55 forms a parallelogram.

Inside the above mentioned vertical arms 3, the supporting axle 53 is fixed on the straight line connecting the axis of the supporting shaft 48 and the axis of the supporting axle 55. The link 5 is pivoted at one end to this supporting axle 53 and at the other end to the supporting shaft 21.

Also, the horizontal arm 6 is provided with the supporting axle 27 on the straight line connecting the axis of the supporting axle 55 and the axis of the supporting pin 119 and in a position in which the distance from the axis of this supporting axle 55 is equal to the distance between the axis of the supporting shaft 21 and the axis of the supporting axle 53. The parallel rod 4 is pivoted at one end to the supporting shaft 21 and at the other end to the supporting axle 27. The distance between the axes of the supporting shafts 21 and 27 is equal to the distance between the axes of the supporting axles 53 and 55. Therefore, the rectangle formed by connecting the respective axes of these supporting members 21, 53, 55 and 217 forms a parallelogram.

Further, the supporting axle 55 is fitted not only with the link 118 but also another link 121 fixed at its other end to a supporting pin 122. By the way, the straight line connecting the axes of the supporting members 55 and 122 is at right angles with the straight line connecting the axes of the supporting members 55 and 119.

The horizontal arm 6 is fitted at the forward end with a γ-axis driving device I so as to be rotatable with a supporting shaft 123 as a center. This supporting shaft 123 is positioned on the extension of the straight line connecting the axes of the above mentioned supporting members 55 and 199. A link 124 is pivoted at one end to the supporting shaft 123 and at the other end to a supporting shaft 125. The distance between the axes of these supporting shafts 123 and 125 is made equal to the distance between the axes of the supporting shafts 55 and 122. Further, a horizontal rod 126 is pivotally connected at one end to the supporting shaft 125 and at the other end to the supporting shaft 122. As the distance between the axes of the supporting shafts 125 and 122 of this horizontal rod 126 is equal to the distance between the axes of the supporting shafts 123 and 55, the rectangle formed by connecting the respective axes of the supporting shafts 123, 55, 122 and 125 forms a parallelogram. By the way, a θ-axis driving device J and β-axis driving device K are respectively of the same construction as in the above mentioned embodiment and make respective predetermined actions.

Figure 14:
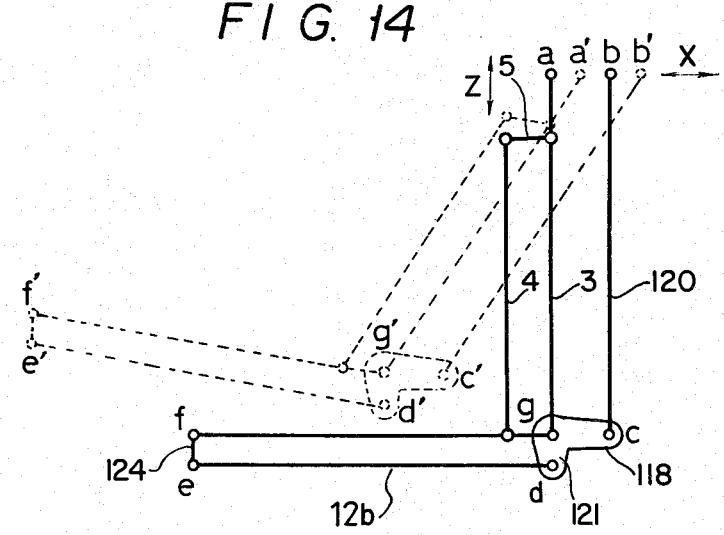
FIG. 14 is a sketch showing the operation of the robot of FIG. 12.

In such double mechanism, in whatever position the arm mechanism 127 may be, the hand part 95 can be always kept horizontal. This shall be explained with reference to FIG. 14. The rectangles a-b-c-g and d-e-f-g form parallelograms, $\overline{gc}$ and $\overline{gd}$ are at right angles with each other and $\overline{ab}$ is horizontal. Therefore, $\overline{gc}$ and $\overline{fg}$ are also horizontal, $\overline{fe}$ is vertical and the hand 95 fixed at right angles with $\overline{fe}$ can be kept horizontal.

In such state, in case the arm mechanism moves as shown by the broken lines, $\overline{ab}$ will move in the horizontal direction so as to be $\overline{a'b'}$ and, as the rectangle a-b-c-g forms a parallelogram, the rectangle a'-b'-c'-g' will also become a parallelogram. Therefore, a $\overline{g'c'}$ is horizontal and $\overline{g'd'}$ is at right angles with $\overline{g'c'}$, $\overline{g'd'}$ will be vertical. Further, as the rectangle d-e-f-g is a parallelogram, the rectangle d'-e'-f'-g' will also form a parallelogram and, as $\overline{g'd'}$ is vertical, $\overline{f'e'}$ will be also vertical and the hand 95 fitted at right angles with this $\overline{f'e'}$ will be horizontal.

Thus, in whatever position the arm mechanism 127 may be, the hand 95 will be kept horizontal.

I claim:

1. An industrial robot comprising a body mounted on a supporting base for rotation about a θ-axis, means located in said body for reciprocable movement in a horizontal X-axis, and means located in said body for reciprocable movement in a vertical Z-axis, a pair of depending upper arms each pivotably mounted at one end to said means for movement in the X-axis, a work arm pivotally secured at its rear end to said upper depending arms, and extending parallel to said X-axis, a pair of rods each pivotally mounted at one end to said means for movement in the Z-axis and pivotally connected at the other end to said work arm intermediate its ends, a pair of straight links pivotally connected at one end co-axially with the pivot connection of said rods with the means for movement in said Z-axis and at the other end to said depending arms in line with the pivotal connection of said depending means with the means for movement in the X-axis and with the pivotal connection to said work arm, each of said links being arranged parallel to the axis of said work arm and having a length equal to the distance between the pivot connection of said rods and said depending arms with said work arm to thereby form a parallelogram, and means exerting a force against said means for movement in the Z-axis opposite to that of gravity to thereby balance said work arm in the vertical direction.

2. The robot according to claim 1 wherein said means for reciprocal movement in the X-axis comprises a first support shaft extending transversely to the X-axis and movable in a pair of slots formed in opposite walls of said body, said depending arms being pivotally connected to the end of said first support shaft and motor means for reciprocating said first support shaft in said X-axis, and said means for reciprocable movement in the Z-axis comprises a second support shaft extending transversely to said Z-axis in a pair of slots formed in the opposite walls of said body, said vertical rods being pivotally connected to said second support shaft, and motor means for reciprocating said second support shaft in said Z-axis.

3. The robot according to claim 2 wherein the motor means for each of said first and second support shafts is a reversible electric motor respectively mounted to extend outwardly of said body.

4. The robot according to claim 3 wherein each of said motors is provided with a speed regulating device.

5. The robot according to claim 4 including a nut and screw transmission between said motor and the respective support shaft.

6. The robot according to claim 1, wherein said means for exerting force comprises a pneumatic piston-cylinder.

7. The robot according to claim 6 including speed reduction means for controlling the driving force of said pneumatic cylinder.

* * * * *